United States Patent Office 2,757,458
Patented Aug. 7, 1956

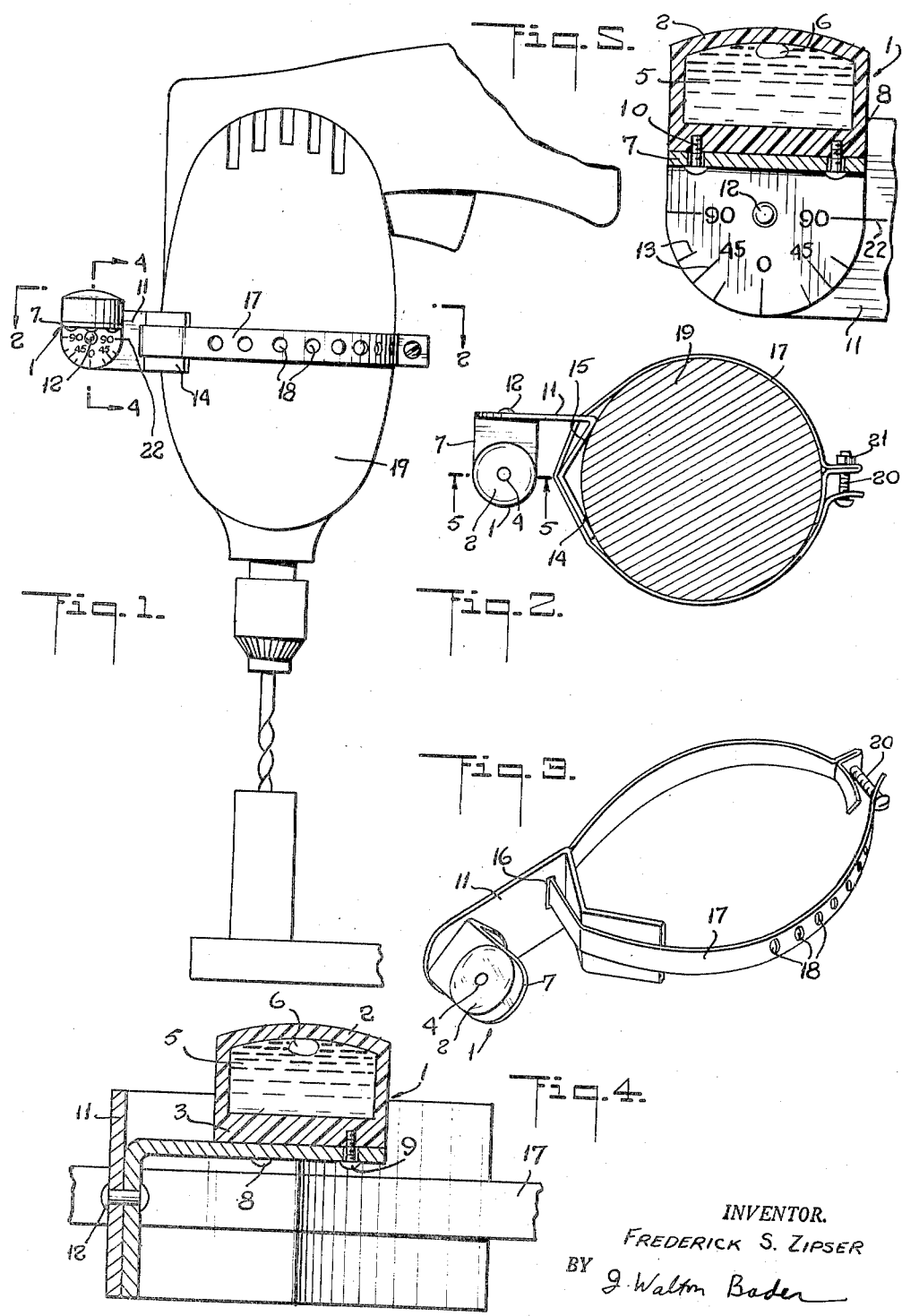

2,757,458

BORING INSTRUMENT LEVELING DEVICE

Frederick S. Zipser, Red Hook, N. Y.

Application December 18, 1952, Serial No. 326,670

1 Claim. (Cl. 33—207)

This invention relates to a levelling device for a boring instrument such as an electric hand drill and has particular applicability to hand operated power tools.

It is well known in the art that proper handicraft requires holes to be produced which are of a certain specific angle throughout their length. It is practically impossible to produce such angles unless one is provided with a rigid mounting for the boring instrument such as a drill press. Such mountings, however, are expensive and beyond the reach of the average handyman.

There have been attempts to obviate this difficulty by mounting spirit levels of tubular type upon hand boring instruments. Unfortunately while this expedient allowed the operator to bore a proper hole in one direction it did not prevent the hole from being of an improper angle in the other direction since the spirit level indicated only one of the correct directions.

I have discovered, however, that if a disk type spirit level is employed in connection with a boring instrument a proper hole can be produced without the use of expensive drill press equipment. No claim is made to a disk level per se, which is a conventional device, but claim is made to the use of this device in combination with a boring instrument.

It is an object of this invention to produce a levelling device for a boring instrument which will allow holes to be produced at a correct angle without variation.

It is an additional object of this invention to produce a levelling device for a boring instrument which will produce the effect, as to tilt from the vertical, of rigid mountings with hand tools.

It is an additional object of this invention to produce a levelling device for a boring instrument which will allow holes to be produced at a predetermined angle at the selection of the operator.

Briefly stated, my invention consists of a levelling device which is designed to be secured to a boring instrument. The levelling device comprises a container member (preferably cylindrical) with a spherical upper face with a concentric lower surface thereof, a liquid within the container member, a gas bubble within the liquid, and a marker ring of diameter at least equal with that of the gas bubble, centrally located upon one face of the container member wherein the center point of the upper face is also the center of the marker ring. The invention may also comprise means for positioning the container member with reference to the boring instrument and means for determining the angle of the hole to be produced.

The invention will be further described by reference to the accompanying drawings which are made a part of this specification.

Fig. 1 is a front view of the levelling device of this invention secured to a boring instrument.

Fig. 2 is a sectional view of the levelling device of this invention taken along lines 2—2 of Fig. 1.

Fig. 3 is a perspective view of the levelling device removed from the boring instrument.

Fig. 4 is a sectional view of the levelling device of this invention taken along lines 4—4 of Fig. 1.

Fig. 5 is a sectional view of the levelling device of this invention taken along lines 5—5 of Fig. 2.

Referring now to the specific embodiment shown in the drawings there is provided container member 1 which is preferably cylindrical in shape. Container member 1 is hollow and is formed with upper face 2 and lower face 3. Upper face 2 is spherical. Marker ring 4 is disposed upon upper face 2 and surrounds the center point thereof. The center of marker ring 4 is also the center point of upper face 2. The undersurface 25 of upper face 2 is of reverse spherical curvature. Container member 1 is filled with liquid 5 which may be any suitable liquid of average density such as water, ethyl or methyl alcohol or the like. Liquid 5 contains gas bubble 6 which is either equal to or less than the diameter of marker ring 4.

Container member 1 is secured to base member 7, which is preferably right-angled in shape, by means of screws 8, 9, and 10. Base member 7 is preferably provided with angle measuring graduations 13. Base member 7 is pivotally secured to holding member 11 by pin 12. Holding member 11 is formed with indicating means 22 which are adapted to register with graduations 13 and also is formed with offset portions 14 and 15 at the rear thereof. Offset portions 14 and 15 bear against boring instrument 19. Holding member 11 is also provided with recess 16. Strap member 17 is disposed within recess 16. Strap member 17 is also provided with a plurality of holes 18 and is adapted to encircle a boring instrument 19. Screw 20 and nut 21 are inserted into holes 18 at a point closest to the far side of boring instrument 19 and thus serve to hold the levelling device to the boring instrument.

With the general description of the invention as set forth above the operation of the device will now be explained.

The device is assembled as indicated in the drawings and strap member 17 is disposed about boring instrument 19. Screw member 20 is inserted into the pair of holes 18 closest to the far side of boring instrument 19. Nut member 21 is then secured to screw member 20 and tightened until the levelling device is firmly affixed to the boring instrument. Base member 7 is then rotated to the angle of hole desired by causing the appropriate angle measuring graduation 13 to register with indicating means 22.

The boring instrument is then operated with the operator making sure that bubble 6 is kept within marker ring 4.

It is clear from the foregoing description that if the angle of the boring instrument is kept constant by making sure that bubble 6 does not travel outside marker ring 4 the hole produced by the instrument will likewise be constant throughout its length and the effect, as to tilt from the vertical, of a rigid mounting will be produced by a hand tool.

Where the device is secured to a rapidly moving boring instrument, such as an electric drill, the rapid rotation of the bit member of the device may produce a vibratory force upon the boring instrument. The vibratory force produces rapid oscillation of the bubble of the level and tends to make the device inaccurate. By making the upper face of the container member spherical and making the lower surface thereof concentric the oscillations are greatly reduced. Furthermore a floating type mounting is used. Holding member 11 is provided with offset portions 14 and 15 at the rear thereof which bear against the sides of the boring instrument but are not rigidly attached thereto. Strap member 17 is disposed within recess 16 in holding member 11. Recess 16 is slightly larger than strap member 17. Strap member 17 snugly fits about the boring instrument.

The foregoing specific embodiments of the invention as shown in the above specification are for illustrative purposes and for purposes of example only. Various changes and modification may obviously be made within the spirit and scope of the invention and will occur to those skilled in this art.

I claim:

A levelling device comprising a hollow cylindrical container member formed with a spherical upper face with a concentric lower surface, a substantially planar lower face, a liquid within said container member, a gas bubble within said liquid, a marker ring of diameter at least equal to that of said gas bubble centrally located upon the upper face of said container member, the center point of said upper face being also the center point of said marker ring; a substantially right angled base member secured to the lower face of said container member, angle measuring means upon said base member, a holding member bearing indicating means adapted to register with said angle measuring means and being formed with a front portion and a plurality of substantially offset portions at the rear thereof adapted to bear against said boring instrument said base member being pivotally secured to the front portion of said holding member, said holding member being also provided with a recess therein, a strap member of slightly smaller size than that of said recess disposed therein, said strap member being also provided with a plurality of holes and adapted to surround a boring instrument, and a screw member adapted to secure the ends of the strap member to one another.

References Cited in the file of this patent

UNITED STATES PATENTS

| | | |
|---|---|---|
| 970,360 | Whigham | Sept. 13, 1910 |
| 1,794,254 | Sherwood | Feb. 24, 1931 |
| 1,898,367 | Heinze | Feb. 21, 1933 |
| 2,206,003 | Donnell | June 25, 1940 |
| 2,356,311 | Geier | Aug. 22, 1944 |
| 2,452,930 | Ivey | Nov. 2, 1948 |
| 2,541,366 | Kennedy | Feb. 13, 1951 |